United States Patent [19]
Ohya

[11] Patent Number: 5,840,237
[45] Date of Patent: Nov. 24, 1998

[54] PALLET FOR RAW COVER TIRE AND MANUFACTURING METHOD OF TIRE USING THE SAME

[75] Inventor: Yukihide Ohya, Kobe, Japan

[73] Assignee: Sumitomo Rubber Industries, Ltd., Hyogo-ken, Japan

[21] Appl. No.: 724,958

[22] Filed: Oct. 2, 1996

[30] Foreign Application Priority Data

Oct. 2, 1995 [JP] Japan .................................. 7-255096
Aug. 30, 1996 [JP] Japan .................................. 8-230326

[51] Int. Cl.$^6$ .................................................. B29C 35/00
[52] U.S. Cl. ........................... 264/326; 206/304; 211/23; 414/426; 425/38
[58] Field of Search .................................... 264/315, 326; 425/38; 211/23, 24; 414/426, 428; 206/304; 269/16

[56] References Cited

U.S. PATENT DOCUMENTS

| | | |
|---|---|---|
| 4,252,241 | 2/1981 | Trail . |
| 4,606,714 | 8/1986 | Nixon et al. ................. 425/38 |
| 4,637,644 | 1/1987 | Trethowan .................. 425/38 |
| 4,681,521 | 7/1987 | Grotkasten . |
| 4,800,059 | 1/1989 | Drewel et al. ............... 425/38 |
| 5,117,975 | 6/1992 | Kreps ......................... 425/38 |

FOREIGN PATENT DOCUMENTS

| | | |
|---|---|---|
| 0162686 | 11/1985 | European Pat. Off. . |
| 0425908 | 5/1991 | European Pat. Off. . |

*Primary Examiner*—Mathieu D. Vargot
*Attorney, Agent, or Firm*—Birch, Stewart, Kolasch & Birch, LLP

[57] ABSTRACT

A pallet for raw cover tire has a circular bottom plate, and a supporting portion provided to a periphery of the bottom plate and supporting one of outer side surfaces of side walls of a raw cover tire. The supporting portion has a first receiving surface of a cone form inclining downwardly toward the bottom plate at an angle α to the bottom plate, and a second receiving surface of a cone form extending upwardly from an upper edge of the first receiving surface at an angle β smaller than the angle α.

5 Claims, 9 Drawing Sheets

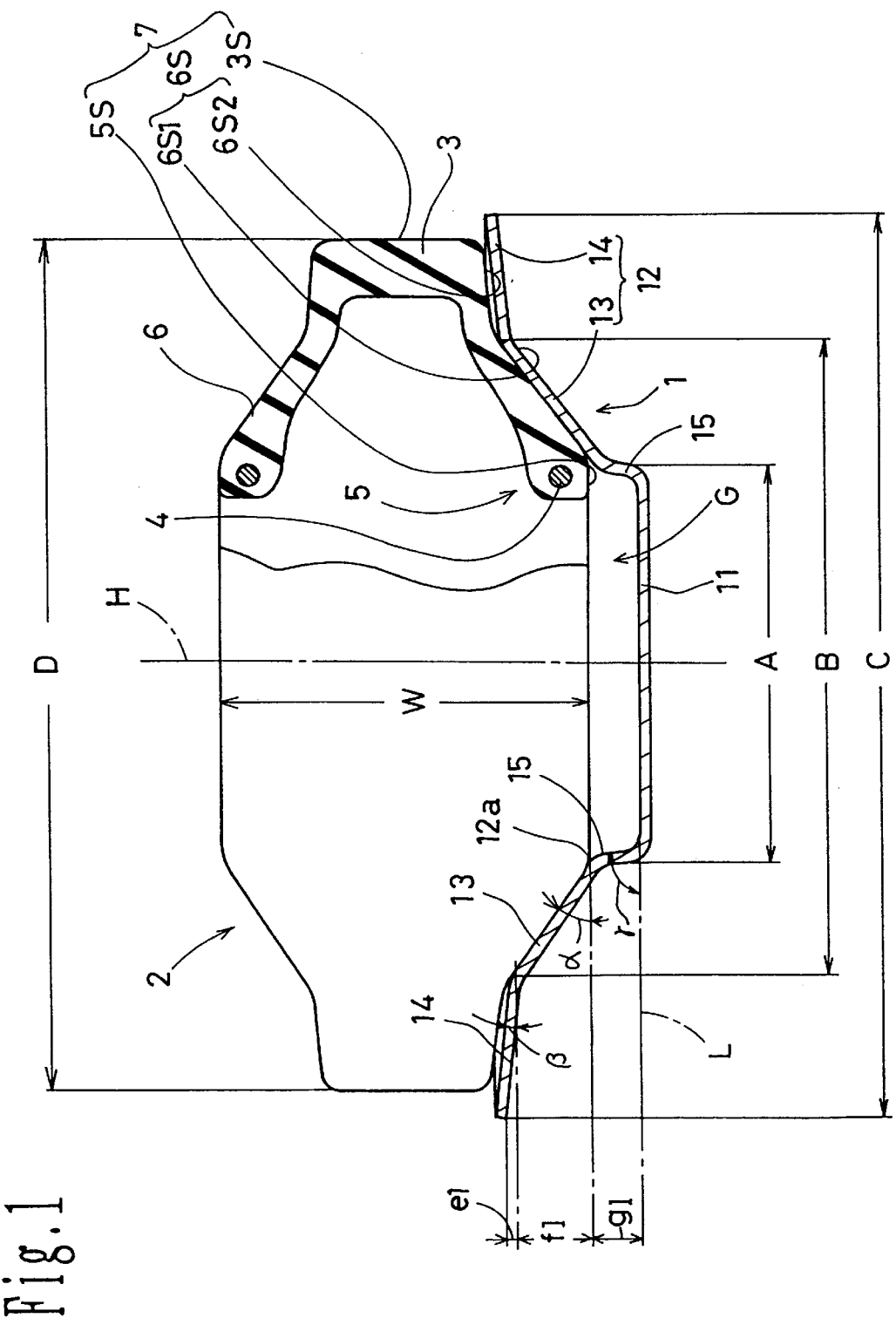

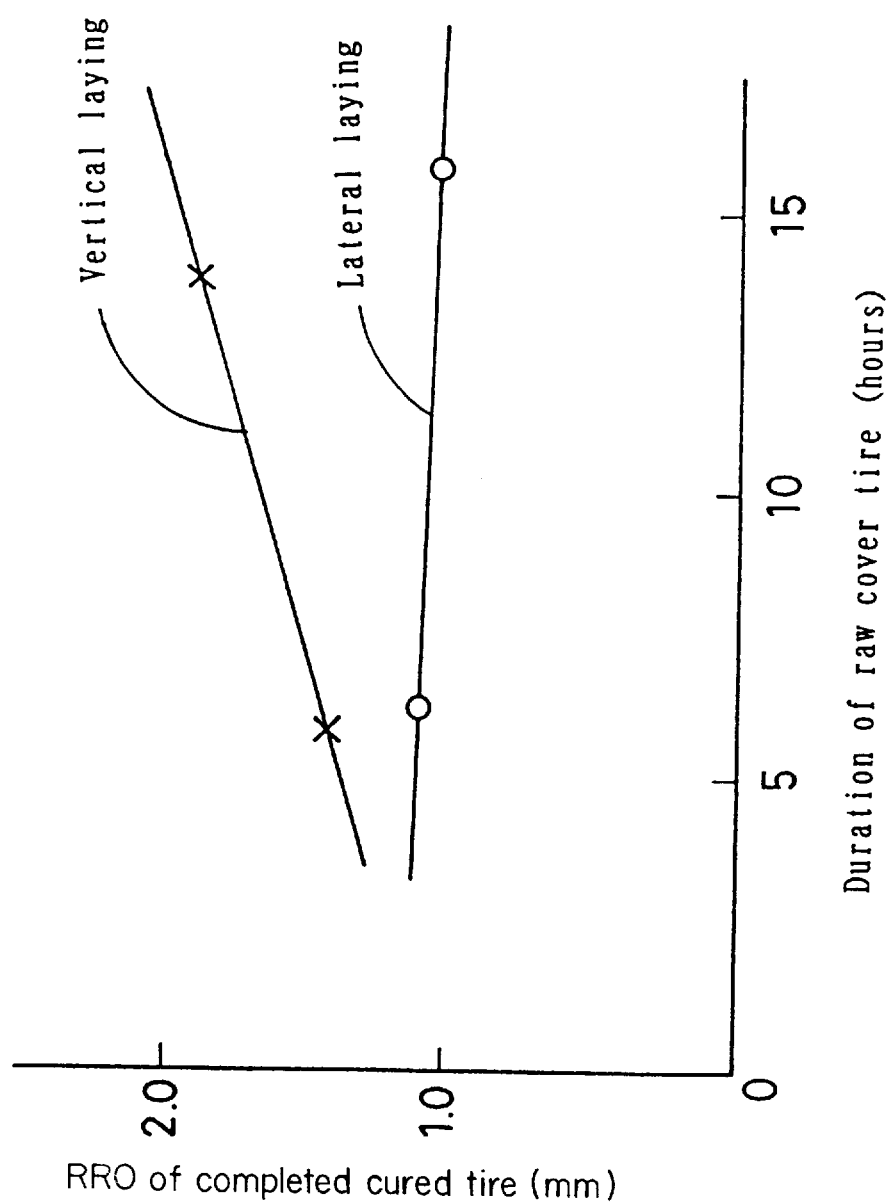

PALLET FOR RAW COVER TIRE AND MANUFACTURING METHOD OF TIRE USING THE SAME

BACKGROUND OF THE INVENTION

The present invention relates to a pallet and manufacturing method of tire capable of preventing gradual decline of roundness of the tread outer circumferential surface until the raw cover tire is delivered into the vulcanizing step as being mounted on the pallet, and enhancing the quality of completed cured tire.

FIELD OF THE INVENTION

In the manufacture of tire, the raw cover tire before vulcanization is likely to deform gradually in the process of storage and conveying until delivered into the vulcanizing step. In particular, the outer distortion occurring on the tread outer circumferential surface is present in the completed tire after vulcanizing and forming, and it causes to increase the deflection in the radial direction of tread outer circumferential surface, so-called radial run-out (RRO). As a result, the tire vibration in driving increases, and the tread outer circumferential surface is likely to be worn unevenly.

On the other hand, in storing and conveying the raw cover tire, hitherto, with a primary purpose of minimizing the occupied area, the raw cover tire a1 was placed vertically by using a crescent pallet p1 having a receiving surface b1 along the tread outer circumferential surface t1 as shown in FIGS. 7(A) and 7(B).

However, when the raw cover tire a1 is placed vertically as shown in FIGS. 7(A) and 7(B), the entire raw cover tire a1 is deformed gradually by the weight of the annular raw cover tire a1. In particular, the side wall located at the lower side in vertical state is deformed extremely as compared with the side wall at the upper side, and hence the radius difference (r1−r2) on the tread outer circumferential surface t1 increases, and the RRO is extremely worsened.

As shown in FIG. 8, alternatively, the raw cover tire a1 may be laid down laterally by receiving the outer side surface d1 of the bead by a dish-like pallet p2. The inventor investigated into the relationship between the duration of leaving the raw cover tire in vertical state and in lateral state, and the RRO of completed tire vulcanized after leaving, and obtained the results as shown in FIG. 4, in which the tire left in lateral state was smaller in RRO than the tire left in vertical state, and smaller in the changing amount, and hence superior in uniformity. In FIG. 4, the duration refers to the time from forming of raw cover tire until start of vulcanizing.

Even in the case of lateral state, however, in particular in a large tire with applicable rim size of 15 inches or more or in a heavy tire, the difference is large between the deformation of the side wall sd at the lower side in lateral state and the deformation of the side wall su at the upper side. As a result, the RRO and its change cannot be decreased sufficiently, and the suppression of vibration of a completed tire and the prevention of occurrence of uneven wear are not sufficient.

The inventor noticed the holding position of the raw cover tire by the pallet in lateral state, and discovered it is preferable and effective for decreasing the RRO to hold the outer side surface of the side wall near the outer circumferential surface of the tread, as compared with holding of the outer side surface of the bead.

SUMMARY OF THE INVENTION

It is a primary object of the invention to present a pallet of a raw cover tire and a manufacturing method of tire being capable of effectively suppressing gradual deformation of tire taking place during storage and conveying of a raw cover tire, improving the RRO of the completed tire, suppressing tire vibration while driving, and preventing occurrence of uneven wear.

According to the invention relating to a pallet for raw cover tire, the raw cover tire has a tire outer surface consisting of an outer circumferential surface of a tread, outer side surfaces of beads each with a bead core, and outer side surfaces of side walls extending from the outer circumferential surface of the tread to the outer side surfaces of the beads and varying in the inclination angle to a surface at right angle to the tire axial center, and the pallet comprises a circular bottom plate disposed at right angle to the tire axial center, and a supporting portion provided radially outside of an outer periphery of the bottom plate and supporting one of the outer side surfaces of the side walls of the raw cover tire, the supporting portion having a first receiving surface of a cone form inclining downwardly toward the bottom plate at an angle $\alpha$ to the bottom plate, and a second receiving surface of a cone form extending upwardly from an upper edge of the first receiving surface at an angle $\beta$ smaller than the angle $\alpha$.

A riser wall rising upwardly at an angle $\gamma$ larger than the angle $\alpha$ is preferable to be provided between the bottom plate and the supporting portion.

The angles $\alpha$, $\beta$ are preferably in a range of 35.5 to 40.6 degrees, and 0 to 16.0 degrees, respectively. The angle $\gamma$ is also preferably in a range of 70.0 to 90.0 degrees, and more preferably about 90 degrees.

Further, according to the invention relating to a manufacturing method of tire, the manufacturing method of tire comprises a forming step for forming a raw cover tire, a vulcanizing step for vulcanizing the raw cover tire, and a step of storing or conveying the raw cover tire between the forming step and the vulcanizing step, the raw cover tire has a tire outer surface consisting of an outer circumferential surface of a tread, outer side surfaces of beads each with a bead core, and outer side surfaces of side walls extending from the outer circumferential surface of the tread to the outer side surfaces of the beads and varying in the inclination angle to a surface at right angle to the tire axial center, and the storing or conveying step uses a pallet having a supporting portion supporting one of the outer side surfaces of the side walls of the raw cover tire.

BRIEF DESCRIPTION OF THE DRAWINGS

An embodiment of the present invention will now be described, by way of example, referring to the attached diagrammatic drawings, in which;

FIG. 1 is a sectional view showing an example of an embodiment of a pallet for the invention.

FIG. 4 is a graph showing the relation of vertical and lateral mounting direction and RRO of completed tire.

DETAILED DESCRIPTION OF THE INVENTION

Figure 2A:
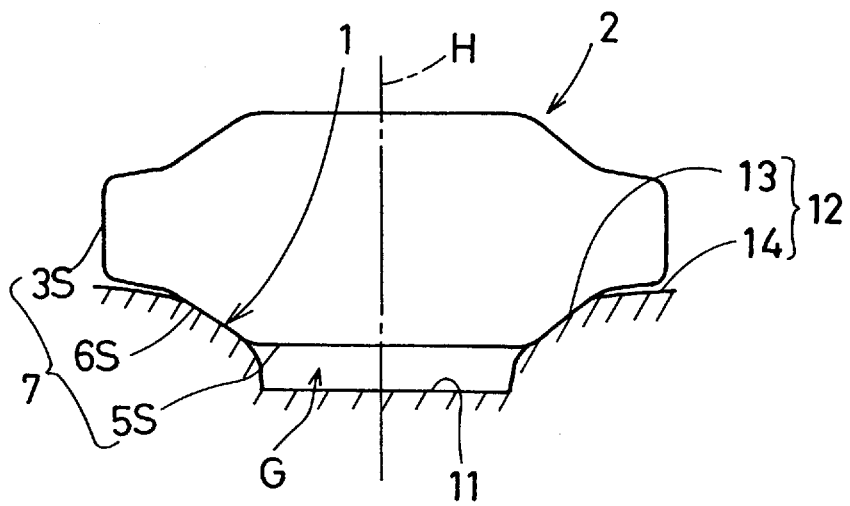
FIGS. 2(A) and 2(B) are sectional views showing examples of usage.

A pallet 1 of the invention is used for mounting a raw cover tire 2 roughly formed in a forming step, and storing or conveying the raw cover tire 2 until it is delivered into a vulcanizing step.

The raw cover tire 2 has a tire outer surface 7 consisting of an outer circumferential surface 3S of a tread 3 in a nearly cylindrical form (hereinafter called tread surface 3S), outer side surfaces 5S of two beads 5 each having a bead core 4 (hereinafter called bead surfaces 5S), and outer side surfaces 6S of two side walls 6 linking the tread surface 3S and the bead surfaces 5S (hereinafter called side wall surfaces 6S). The raw cover tire 2 has cord reinforcing layers including a carcass (not shown) extending between the beads 5 and belt layer (not shown) disposed radially outside the carcass. And the raw cover tire 2 is formed into a large pneumatic tire with an applicable rim size of 15 inches or more.

The bead surface 5S is disposed nearly parallel to a plane L at a right angle to the tire axial center H. The tread surface 3S is formed as an outer circumferential surface of a cylindrical body centered about the tire axial center H.

The side wall surface 6S comprises, in this example, a side wall main surface 6S1 inclining and extending from the bead surface 5S inwardly in the tire axial direction, and a side wall buttress surface 6S2 smoothly consecutive to the side wall main surface 6S1 and intersecting with the tread surface 3S at an angle close to a right angle.

In this example, the side wall main surface 6S1 and the side wall buttress surface 6S2 are formed nearly in a straight form mutually different in inclination angle, even before being mounted on the pallet 1. But the entire side wall surface 6S may be formed in an arc curve by increasing the inclination angle continuously. In part of the arc curve, meanwhile, a straight portion with a newly constant inclination angle may be interposed.

The pallet 1 comprises, as shown in FIG. 1, a circular bottom plate 11 nearly parallel to the plane L, and a supporting portion 12 provided around the bottom plate 11 for mounting and supporting one of the side wall surfaces 6S. The supporting portion 12 comprises a first receiving surface 13 of a cone form inclining downward toward the bottom plate 11 at an approximately constant angle $\alpha$ to the plane L, and a second receiving surface 14 of a cone form extending from an upper edge (a radially outer edge) of the first receiving surface 13 at an angle $\beta$ which is smaller than the angle $\alpha$.

In this example, a riser wall 15 of small height rises upwardly from the periphery of the bottom plate 11 to a lower edge 12a of the supporting portion 12 at an angle $\gamma$ which is larger than the angle $\alpha$.

Thus, the pallet 1 is formed in shallow bottom dish form integrally comprising the bottom plate 11, supporting portion 12, and riser wall 15, and is formed, for example, by pressing metal plates such as steel, casting metal material, synthetic resin material, and many other means.

The angles $\alpha$, $\beta$ of the supporting portion 12, and angle $\gamma$ of the riser wall 15 may be properly selected and set according to the shape and size of the raw cover tire 1 so long as the relation of three angles satisfies the condition of $\beta<\alpha<\gamma$.

The tire manufacturing method of the second invention is intended to store or convey the raw cover tire 2 by using the pallet 1, between the raw cover tire forming step and vulcanizing step. At this time, the raw cover tire forming step and vulcanizing step are the same as in the prior art.

Figure 8:
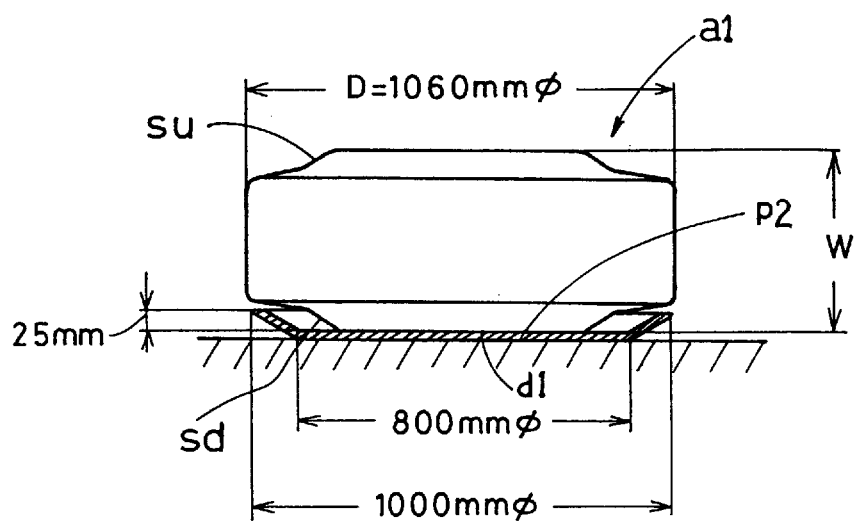
FIG. 8 is a sectional view showing a conventional lateral pallet.

As shown in FIG. 1 and FIG. 2(A), the raw cover tire 2 is put on the pallet 1 by matching the central axis in radial direction of the pallet 1 and the tire axial center H of the raw cover tire 2. At this time, a gap G is formed between the bead surface 5S and the bottom plate 11, and therefore, in the example, the side wall main surface 6S1 abuts against the first receiving surface 13 of the pallet 1, and the entire weight of the raw cover tire 2 is supported by the side wall main surface 6S1. Therefore, the projecting extent of the tread surface 3S in the radial direction from the supporting position, and the projecting extent in the height direction are substantially decreased as compared with the conventional pallet for supporting by the bead surface as shown in FIG. 8. Moreover, since the side wall surface 6S is supported by first contacting with the receiving surface closer to this surface 6S, that is, the first receiving surface 13 in this example, deformation of the side wall surface 6S itself is small, and its changes in the time course can be prevented. As a result, also in the completed tire after vulcanizing, the RRO is improved, occurrence of vibrations is small, and the tire of high quality suppressed in the occurrence of uneven wear can be presented.

Figure 2B:
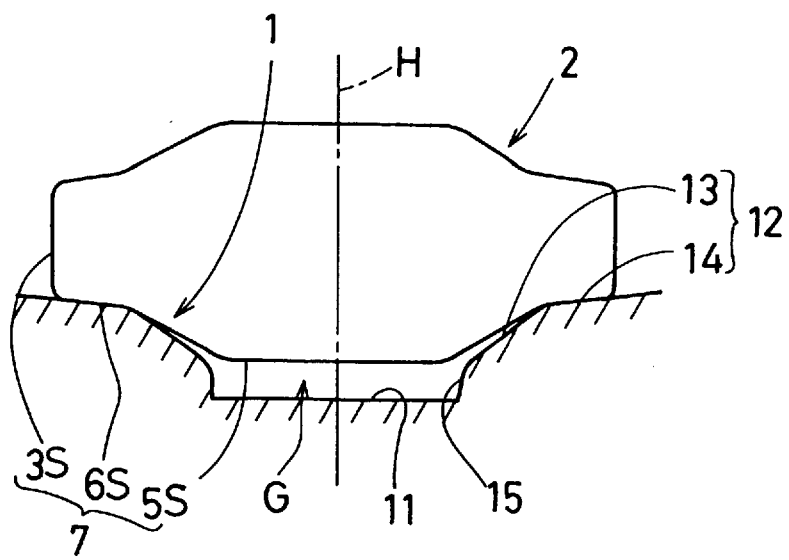

Incidentally, as shown in FIG. 2(B), the raw cover tire 2 may be held by causing the side wall buttress surface 6S2 of the side wall surface 6S to abut against the second receiving surface 14.

Figure 3:
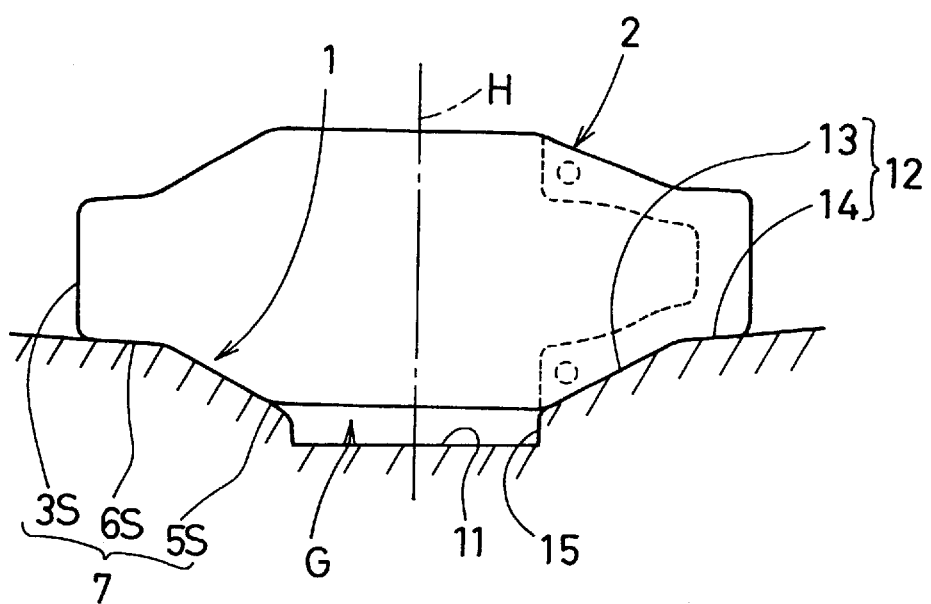
FIG. 3 is a sectional view showing other example of usage.

Further, in the case of raw cover tire of large diameter or heavy raw cover tire, as shown in FIG. 3, the entire surface of the side wall surface 6S and the bead surface 5S may be supported by the first and second receiving surfaces 13, 14 in collaboration.

As in this example, the gap G is formed by providing the riser wall 15 between the bead surface 5S and bottom plate 11, and therefore the raw cover tire 2 can be securely supported by the side wall surface 6S, so that the raw cover tire 2 can be mounted at high stability. Therefore, the angle $\gamma$ is preferably in a range of 70 to 90 degrees to have a gap G, more preferably about 90 degrees.

In the pallet 1, since the first and second receiving surfaces faces 12, 13 have different angles $\alpha$, $\beta$, the side wall surface 6S is supported by first contacting with the receiving surface 12 or receiving surface 13 closer to this surface 6S. Hence, deformation of the side wall surface 6S itself is suppressed. Moreover, since the inclination angles $\alpha$ and $\beta$ are different, a sufficient versatility is allowed for the diameter of the mountable tire, that is, the tire size, and raw cover tires of plural types or plural sizes can be commonly handled by one pallet.

EXAMPLES

I. Standard dimensions of pallet

The pallet 1 of the embodiment brings about greater effects on the large tire in the following size.

Figure 6:
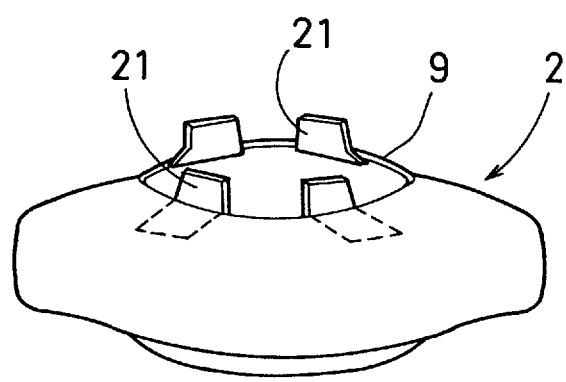
FIG. 6 is a perspective view showing a method of measuring width W of a raw cover tire.
Figure 7A:
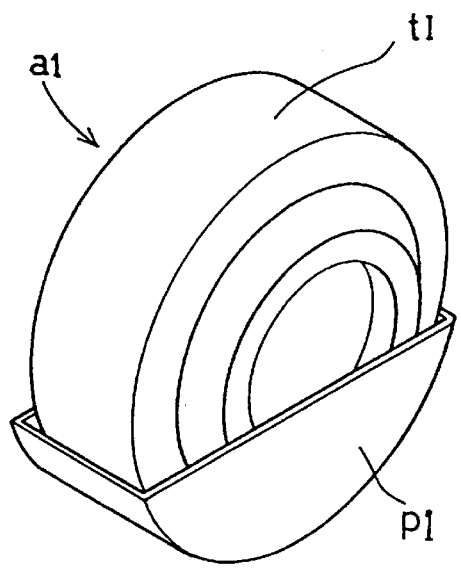
FIG. 7(A) is a perspective view showing a conventional vertical pallet.
Figure 7B:
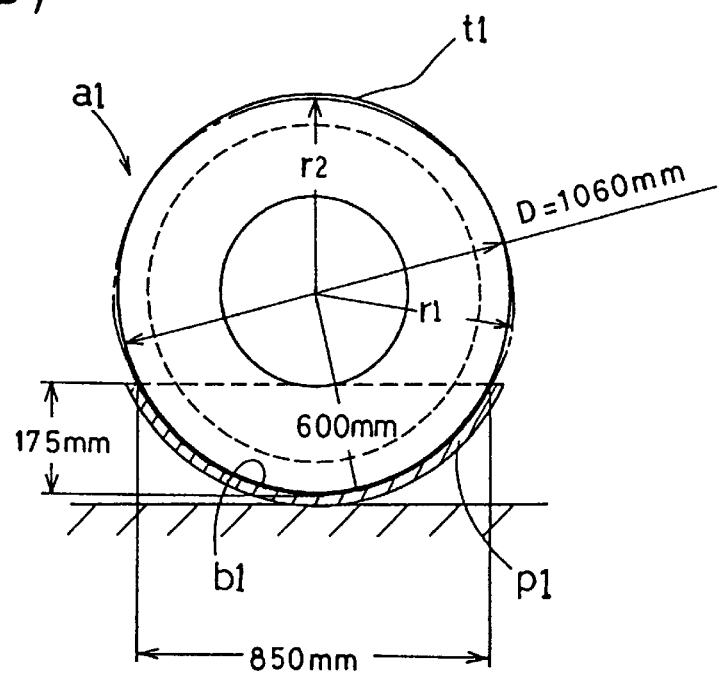
FIG. 7(B) is a sectional view showing a conventional vertical pallet.

Tire size—Rim size 15 inches to 24.5 inches:

Width (W) of raw cover tire—Max. 600 mm:

Outer diameter (D) of raw cover tire—880 to 1200 mm:

The width (W) of the raw cover tire, as shown in FIG. 6, is the dimension measured after leaving for an hour, by lifting the upward bead 5 by using four pawls 21.

Preferred principal dimensions of the pallet 1 to be used on the raw cover tire of the above dimensions are shown in Table 1. In Table 1, symbol A denotes the inner diameter of the first receiving surface 13, B is the outer diameter of the first receiving surface 13, C is the outer diameter of the second receiving surface 14, e1 is the height of the second receiving surface 14, f1 is the height of the first receiving surface 13, and g1 is the height of the riser wall 15.

TABLE 1

Basic dimensions of pallet (symbols shown in FIG. 1)

|   | Dimension (mm) in Radial direction |   | Dimension (mm) in Width direction |
|---|---|---|---|
| A | 520 ~ 560 φ | e1 | 0 ~ 20 |
| B | 940 ~ 980 φ | f1 | 150 ~ 180 |
| C | 1080 ~ 1120 φ | g1 | 20 ~ 50 |

II. Setting of the pallet shape suited to the purpose of use

In laying the raw cover tire laterally, trials and selections were attempted to find the optimum relation of shape and dimension as for the form of pallet with smallest change of RRO.

Figure 5A:
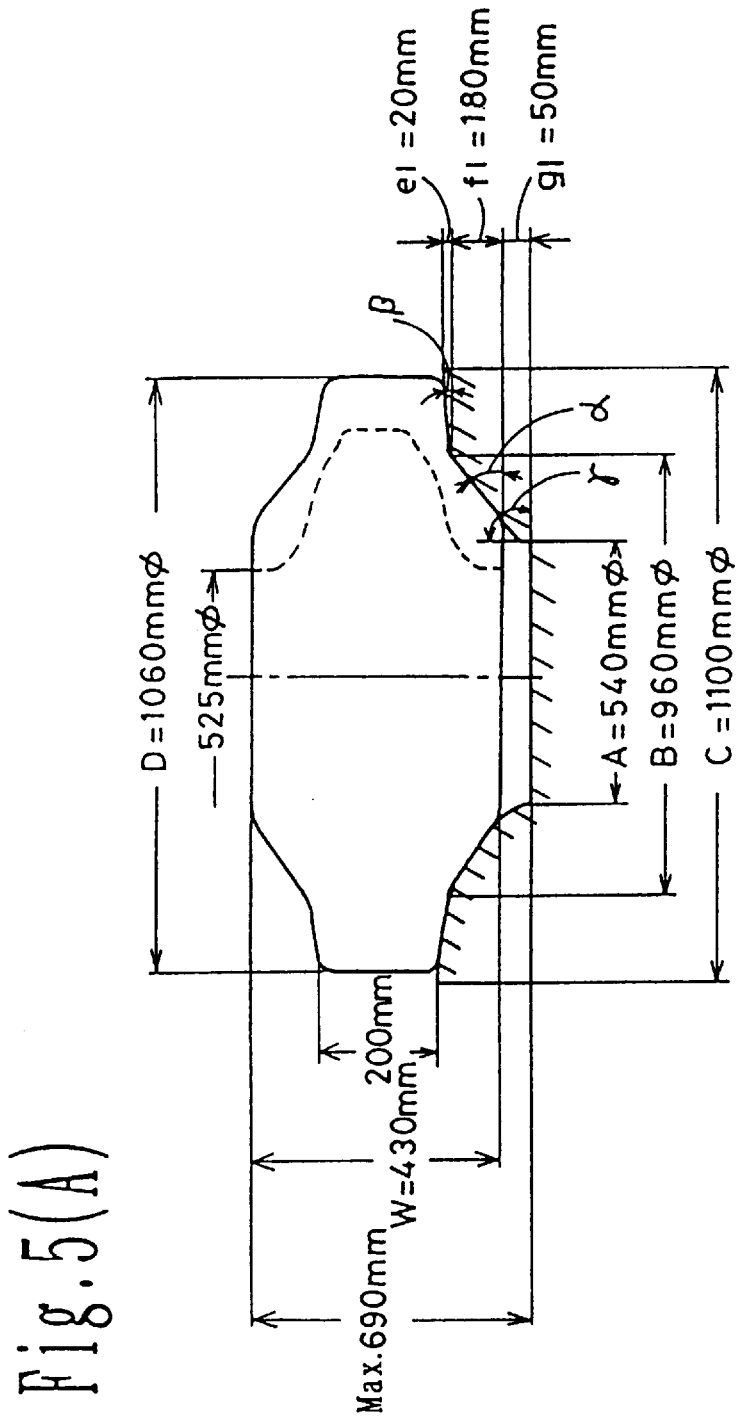
FIGS. 5(A) and 5(B) are sectional views showing embodiments together with dimensions.
Figure 5B:
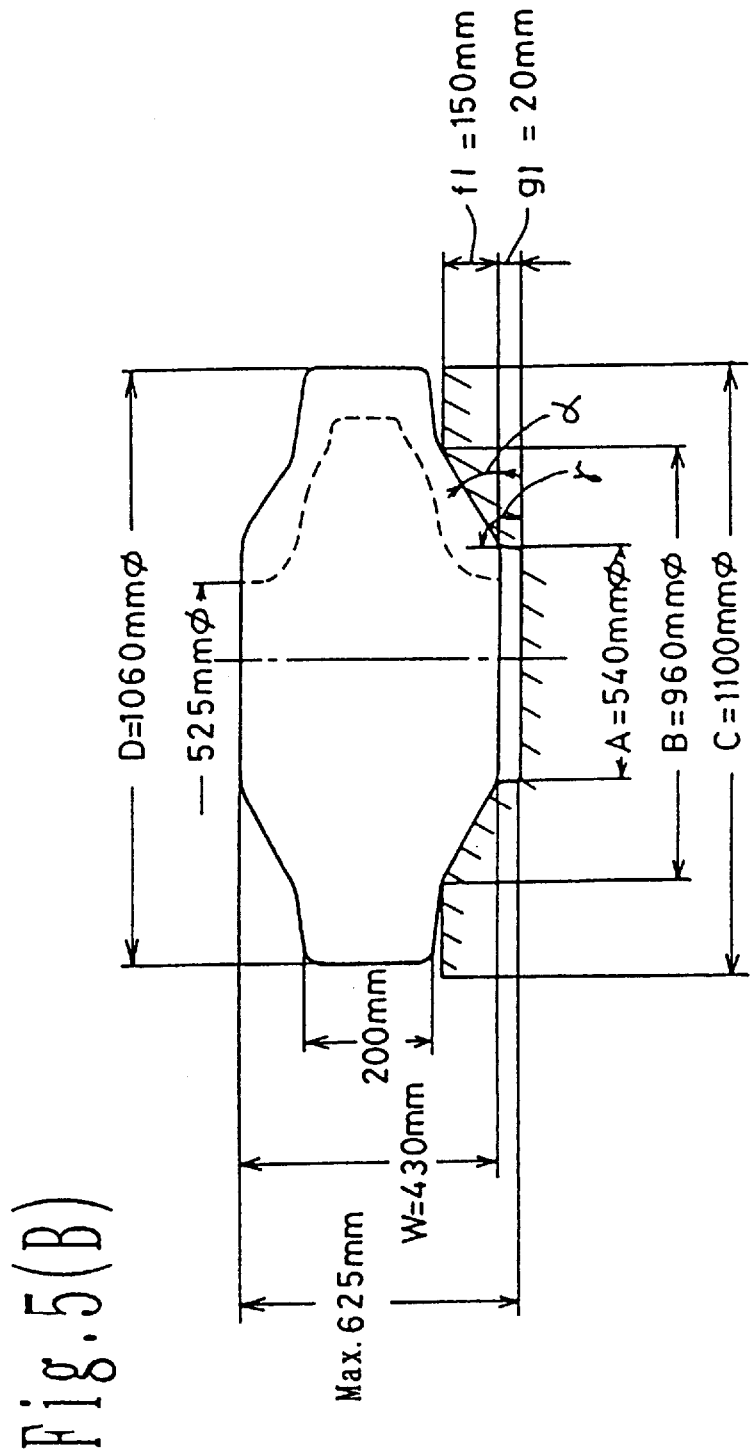

Raw cover tires used in tests were in the same dimensions as shown in FIGS. 5(A) and 5(B), and the performance was verified by varying the pallet dimensions.

As a result of tests, the pallet shape and its inclination angle of the smallest change of RRO are shown in FIG. 5(A) and Table 2, and the pallet shape and its inclination angle suppressing the change of raw cover tire RRO while considering the stock amount are shown in FIG. 5(B) and Table 2, respectively.

TABLE 2

|   | Pallet shape for smallest RRO change | Pallet shape for decreasing RRO considering stock amount |
|---|---|---|
| Pallet dimensions | FIG. 5(A) | FIG. 5(B) |
| Angle α | 40.6 deg. | 35.5 deg. |
| Angle β | 16.0 deg. | 0.0 deg. |
| Angle γ | 90.0 deg. | 90.0 deg. |
| Height of raw cover tire at mounting | Max. 690 mm | Max. 625 mm |

III. Checking of RRO by difference of placing of raw cover tire

In the tires having the shape and dimensions shown in FIG. 5(A), trial pallets (embodiments) conforming to the constitution of the invention in the shape and dimensions in FIG. 5(A) were manufactured, and changes of RRO in completed tires were studied. Incidentally, using the raw cover tires of same dimensions, changes of RRO were compared between the conventional vertical pallet (comparison 1) and lateral pallet (comparison 2).

In both embodiments and comparisons, the values are indicated by the average of five tires.

The test results are summarized in Table 3.

TABLE 3

|   | Embodiment | Comparison 1 | Comparison 2 |
|---|---|---|---|
| Laying direction of raw cover tire | Lateral | Vertical | Lateral |
| Structure and | | | |

TABLE 3-continued

|   | Embodiment | Comparison 1 | Comparison 2 |
|---|---|---|---|
| Dimensions of Pattel | | | |
| Duration of raw cover tire | 10 hr | 10 hr | 10 hr |
| RRO | 0.99 mm | 1.64 mm | 1.07 mm |

As a result of tests, the embodiments were confirmed to be small in the change of RRO as compared with comparisons 1 and 2. Therefore, the inclination angle α is preferred in a range of 35.5 to 40.6 degrees, and the inclination angle β, from 0 to 16.0 degrees.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pallet for a raw cover tire, the raw cover tire having a tire outer surface consisting of an outer circumferential surface of a tread, outer side surfaces of beads each with a bead core therein, and outer side surfaces of side walls extending from the outer circumferential surface of the tread to the outer side surfaces of the beads and varying in the inclination angle to a surface at substantially a right angle to the tire axial center, said pallet comprising a circular bottom plate disposed at a substantially right angle to the tire axial center, a supporting portion provided radially outside of an outer periphery of the circular bottom plate and supporting at least one of the outer side surfaces of the side walls of the raw cover tire, said supporting portion having a first receiving surface of a cone form inclining downwardly toward the bottom plate at an angle α to the bottom plate, and a second receiving surface of a cone form extending upwardly from an upper edge of the first receiving surface at an angle β smaller than the angle α, and a riser wall rising upwardly from the periphery of the bottom plate to a lower edge of the supporting portion at an angle γ larger than the angle α of the first receiving surface.

2. The pallet for raw cover tire of claim 1, said angle γ is in a range of 70 to 90 degrees.

3. The pallet for raw cover tire of claim 1, said angle α is in a range of 35.5 to 40.6 degrees, said angle β is in a range of 0 to 16.0 degrees.

4. A manufacturing method of tire comprising the steps of:

forming a raw cover tire, vulcanizing the raw cover tire, and supporting the raw cover tire during storing or conveying of the raw cover tire between the forming step and the vulcanizing step, said raw cover tire having a tire outer surface consisting of an outer circumferential surface of a tread, outer side surfaces of beads each with a bead core therein, and a plurality of outer side surfaces of side walls extending from the outer circumferential surface of the tread to the outer side surfaces of the beads and varying in the inclination angle to a surface at substantially a right angle to the tire axial center, and said supporting step includes using a pallet having a supporting portion having a first receiving surface of a cone form inclining downwardly toward a bottom plate of the pallet at an angle α to the bottom plate, and a second receiving surface of a cone form extending upwardly from an upper edge of the first receiving surface at an angle β smaller than the angle α, the supporting portion supporting at least one of the plurality of outer side surfaces of the side walls of the raw cover tire.

5. A pallet for supporting the axial surfaces of a substantially horizontally disposed raw cover tire, said pallet comprising a circular bottom plate and a supporting portion provided radially outward of an outer periphery of the circular bottom plate for supporting at least one portion of the outer side wall surface of the raw cover tire, said supporting portion having a first receiving surface of a cone form inclining upwardly with respect to the bottom plate at an angle α thereto, and a second receiving surface of a cone form extending upwardly from an upper edge of the first receiving surface at an angle β smaller than the angle α.

* * * * *